Jan. 8, 1946.   H. A. MULLIN   2,392,493
RIM AND WHEEL MOUNTING FOR PNEUMATIC TIRES
Filed Nov. 27, 1942   4 Sheets-Sheet 1
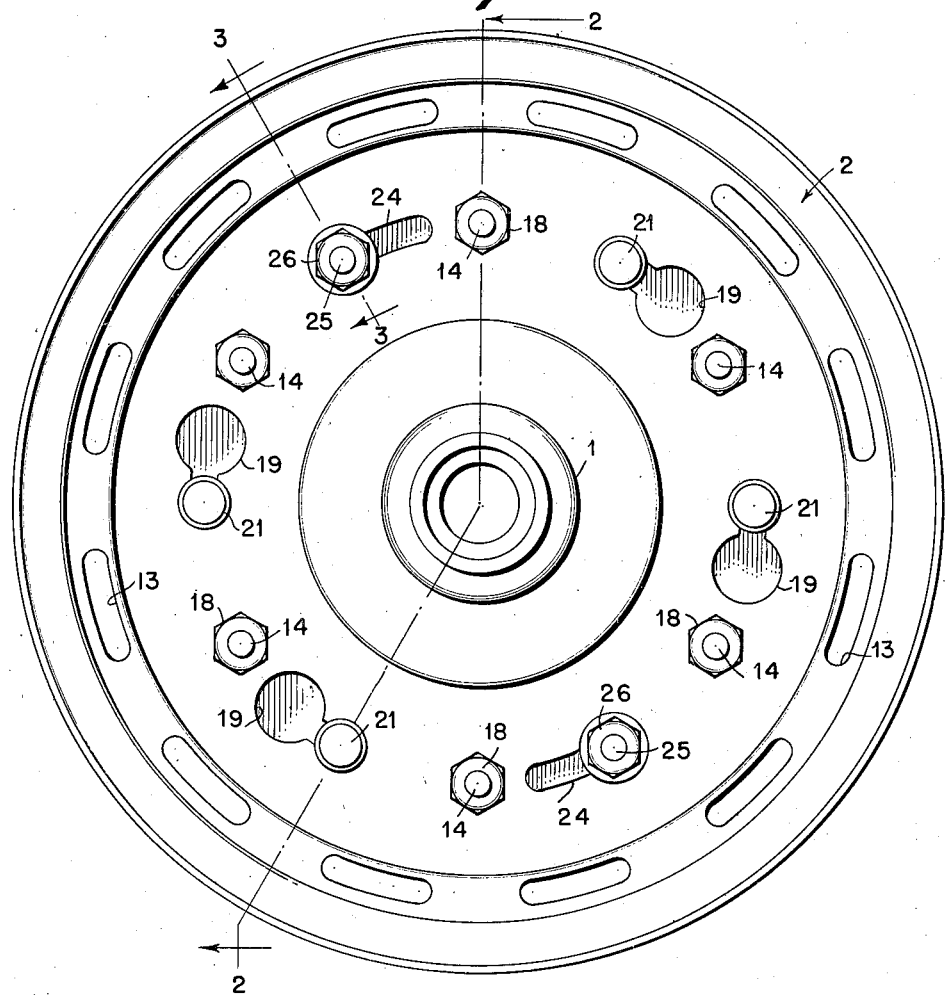
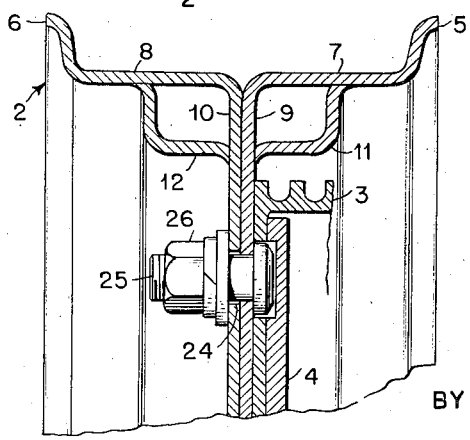
INVENTOR
H. A. MULLIN
ATTORNEYS Jan. 8, 1946.                 H. A. MULLIN                    2,392,493
                  RIM AND WHEEL MOUNTING FOR PNEUMATIC TIRES
                       Filed Nov. 27, 1942      4 Sheets-Sheet 3

INVENTOR
H. A. MULLIN

BY

ATTORNEYS

Jan. 8, 1946.  H. A. MULLIN  2,392,493
RIM AND WHEEL MOUNTING FOR PNEUMATIC TIRES
Filed Nov. 27, 1942  4 Sheets-Sheet 4

INVENTOR
H. A. MULLIN

BY

ATTORNEYS

Patented Jan. 8, 1946

2,392,493

UNITED STATES PATENT OFFICE 2,392,493

RIM AND WHEEL MOUNTING FOR PNEUMATIC TIRES

Henry A. Mullin, Redding, Calif.

Application November 27, 1942, Serial No. 467,111

3 Claims. (Cl. 301—9)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to pneumatic-tired wheels, and has among its objects the provision of a wheel of simple design; the provision of a wheel with which a pneumatic tire can be easily assembled and disassembled; the provision of a wheel of good structural strength; the provision of a wheel which prevents accidental displacement therefrom of a deflated tire; the provision of a wheel having cooling means; the provision of a wheel of decorative appearance; and other objects which will be apparent from the following description and claims and the accompanying drawings, in which Figure 1 is an elevation of a wheel assembly of one embodiment of the invention;

Figure 3 is a section on the line 3—3 of Figure 1;

Figure 2:
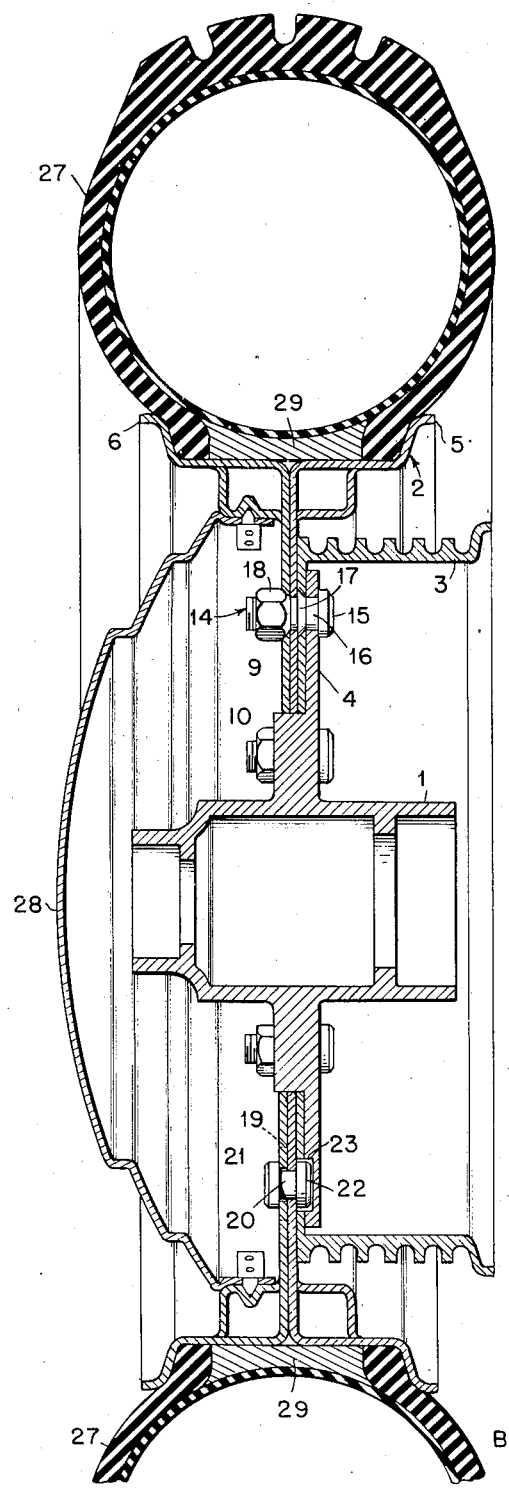
Figure 2 is a section on the line 2—2 of Figure 1, with a hub cap, tire and internal bead support added.

Referring to the drawings in detail, the wheel shown in the embodiment of Figures 1, 2 and 3 comprises, in general, a hub 1, rim 2 and brake drum 3. The hub is provided with an integral radially outwardly extending hub flange 4 to which the brake drum is permanently and the rim is demountably secured. The rim is circumferentially divided, providing inboard and outboard rim members 5 and 6, shaped to provide laterally extending tire-seating flanges 7 and 8 and radially inwardly extending rim-mounting flanges 9 and 10, respectively. Strengthening fillets 11 and 12, which are angle-shaped in cross section, are suitably secured, as by welding, to the respective rim members in the corners formed between the tire-seating and rim-mounting flanges providing tubular formations therewith, and are provided with a plurality of apertures 13. These apertures provide for air circulation through the tubular formations to cool the rim, and they produce a decorative appearance.

The rim is secured to the hub flange by a series of bolts 14 located substantially on a circle. Each of these bolts, as shown in Figure 2, has a head 15 located inside the hub flange, and a shank 16 projecting outwardly through the hub flange, brake drum mounting flange, and two rim-mounting flanges 9 and 10. Each shank is provided with an integral bead 17 to secure the brake drum and permanently attach the bolt to the hub flange, and with a nut 18 which is removable to demount the rim and which, when not removed, simultaneously secures the outboard to the inboard rim member and the rim to the hub.

The tire is demounted from the rim by means of a series of keyhole slots 19 provided in the rim-mounting flange 10 located substantially on the above-mentioned circle, and a series of pins 20 fixed to rim-mounting flange 9, and each provided with a locking head 21 located laterally away from the flange a distance substantially equal to the thickness of flange 10. The construction is such that the locking heads of the pins are insertable through the enlarged parts of the keyhole slots, and relative rotation of the rim members 5 and 6, results in locking them against relative lateral separation. Each pin is assembled with the inboard rim flange by a pin head 22 located on the inboard side of the rim flange and fixed thereto, as by a spot weld. Recesses 23 extend through the brake drum flange and into the hub flange to receive the pin heads when the rim is in its mounted position.

To prevent undesired rotation of the rim members, the rim mounting flanges 9 and 10 are provided with slots 24 and bolts 25, respectively. The bolts are fixed to the inboard side of the rim flange in a manner similar to the fixing of the headed pins 20, and are provided with removable nuts 26, to fix the rim members together when tightened, and allow their separation when the nuts are removed. Slots 24 may, of course, be formed as keyhole slots, rendering it unnecessary to completely remove nuts 26.

To demount a tire after removal of the rim from the hub, it is only necessary to remove nuts 26, rotate the rim parts relative to each other until the locking heads aline with the enlarged parts of the keyhole slots, and then separate the rim parts.

Figure 2 shows the wheel carrying a conventional type straight side bead or non-clincher type pneumatic tire 27 and rim bead flanges to match, and a hub cap 28.

In order to prevent accidental displacement of a deflated tire from the rim in case of a "flat" occurring while the vehicle is in motion, and to provide means for preventing the inner tube from being damaged by the crack between the rim parts, an internal bead support and protector extending continuously about the rim between the tire beads is provided at 29, formed from a strip of any suitable material, which may be a continuous ring or may be a transversely divided ring with overlapping ends.

Figure 4:
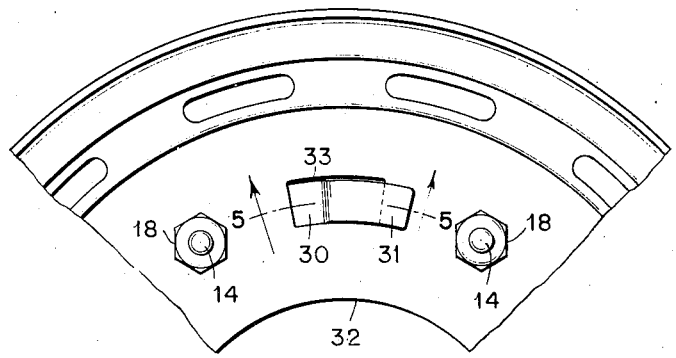
Figure 4 is a fragmentary elevation showing a modified detail.
Figure 5:
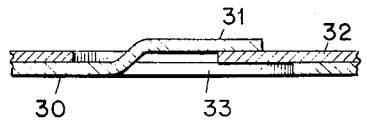
Figure 5 is a section on the line 5—5 of Figure 4.

The embodiment shown in Figures 4 and 5 is similar to that shown in Figures 1 to 3, except that the keyhole slots and pins are modified. Only that portion of the wheel necessary to illustrate the modified detail is shown. Referring to Figures 4 and 5, the rim-mounting flange 30 is provided with a series of struck-up tongues, one of which is shown at 31, provided by U-shaped slits formed in the flange, the material within each slit being struck-up to form a tongue with a portion integrally connecting it to the flange, the free end of the tongue being spaced from the flange a distance substantially equal to the thickness of flange 32 and overlying the aperture from which it is struck-up. Flange 32 is provided with a corresponding series of apertures, one of which is shown at 33. In this embodiment the flanges are assembled together by inserting the tongues through the apertures and relatively rotating the rim members until the tongues override the edges of the apertures.

Figure 6:
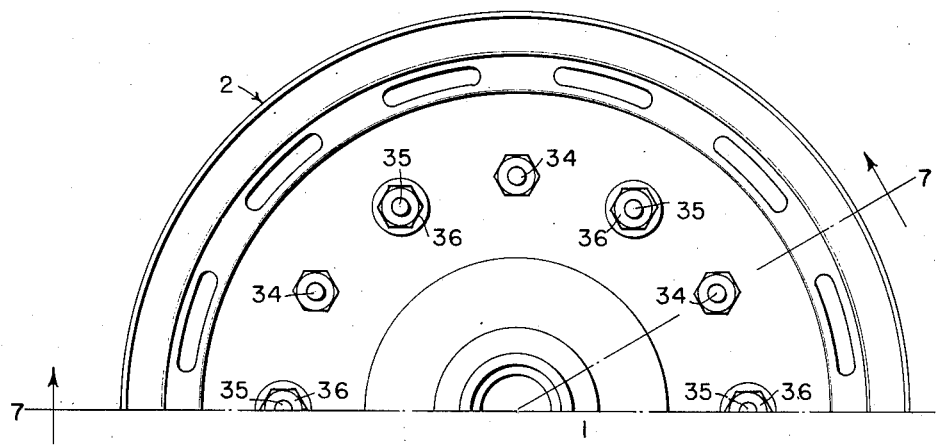
Figure 6 is an elevation of a half wheel assembly of another embodiment of the invention.
Figure 7:
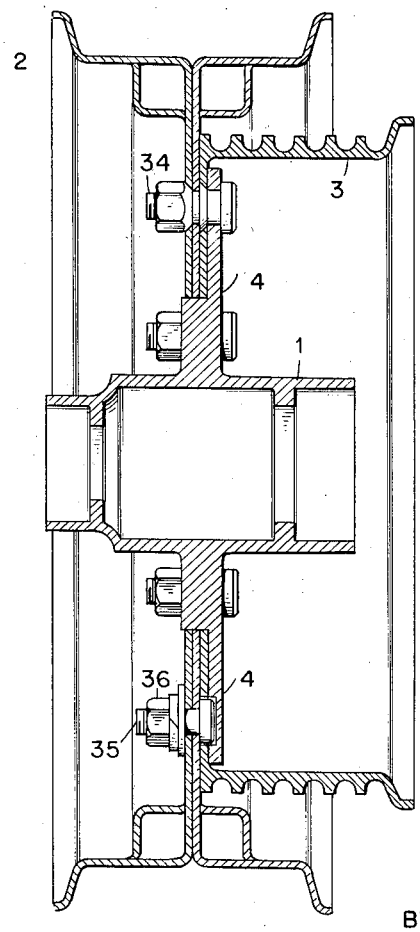
Figure 7 is a section on the line 7—7 of Figure 6.

The embodiment shown in Figures 6 and 7, which is a stronger assembly and avoids the necessity of rotating the rim parts, is preferable in case of heavy installations. The same type of rim-demounting bolts 34 is used as is used at 14 of the embodiment shown in Figures 1 to 3. Substitution for the keyhole slots and pins, and for the slots and bolts, is, however, made by a series of bolts 35 and nuts 36, the bolts being fixed to the inboard rim-demounting flange in a manner similar to the fixing of pins 20 in the embodiment of Figures 1 to 3. In this instance the tire is removed from the rim by removal of nuts 36, and by lateral separation of the rim parts.

The invention set forth in the above-mentioned embodiments is not limited to the description thereof except as may be required by the following claims.

Having thus described my invention, I claim:

1. A vehicle wheel comprising a hub having a radially outwardly extending hub flange, a circumferentially divided rim providing separable rim members each having a radially inwardly extending rim-mounting flange, a series of pins affixed to one of the flanges located substantially on a circle, each provided with a head located laterally away from the flange a distance substantially equal to the thickness of the other rim flange, a series of keyhole slots provided in the other flange for mating with the series of pins, whereby the heads of the pins are insertable through the enlarged parts of the slots and relative rotation of the rim members locks them against lateral separation when carrying a mounted inflated tire, and a series of bolts located substantially on the above-mentioned circle and extending through both rim-mounted flanges for demountably securing the rim to the hub flange.

2. A vehicle wheel comprising a rim having a laterally extending tire-seating flange and a radially inwardly extending rim-mounting flange, an angle-shaped fillet secured in the corner between the flanges and providing a tubular formation therewith, and apertures in the fillets permitting circulation of air through the tubular formation to cool the rim.

3. A vehicle wheel comprising a rim having a laterally extending tire-seating flange and a radially inwardly extending rim-mounting flange, an angle-shaped fillet secured in the corner between the flanges and providing a tubular formation therewith, and apertures in the outboard facing wall of the tubular formation permitting circulation of air through it to cool the rim and providing a decorative appearance.

HENRY A. MULLIN.